United States Patent
Boehme

(10) Patent No.: US 6,583,422 B2
(45) Date of Patent: Jun. 24, 2003

(54) ULTRAVIOLET WATER PURIFIER

(75) Inventor: Hilary Boehme, Hauppauge, NY (US)

(73) Assignee: Atlantic Ultraviolet Corporation, Hauppauge, NY (US)

( * ) Notice: Subject to any disclaimer, the term of this patent is extended or adjusted under 35 U.S.C. 154(b) by 64 days.

(21) Appl. No.: 09/975,231

(22) Filed: Oct. 11, 2001

(65) Prior Publication Data

US 2003/0071225 A1 Apr. 17, 2003

(51) Int. Cl.$^7$ ................................................. G01N 2/01
(52) U.S. Cl. .................................. 250/432 R; 250/436
(58) Field of Search ............................. 250/428, 432 R, 250/435, 436, 492.1; D23/207–210; 210/428, 432 R, 435, 436, 492.1

(56) References Cited

U.S. PATENT DOCUMENTS

| | | | | |
|---|---|---|---|---|
| 3,462,597 A | * | 8/1969 | Young et al. ............... | 250/431 |
| 3,485,576 A | * | 12/1969 | McRae et al. .............. | 205/701 |
| 4,767,932 A | * | 8/1988 | Ellner ........................ | 250/435 |
| 4,825,083 A | * | 4/1989 | Latel et al. ................. | 250/436 |
| 5,019,256 A | * | 5/1991 | Ifill et al. ................... | 210/232 |
| D331,447 S | * | 12/1992 | Boehme et al. ............ | D23/209 |
| 5,200,156 A | * | 4/1993 | Wedekamp ................ | 422/186.3 |
| 5,290,439 A | * | 3/1994 | Buchwald .................. | 210/198.1 |
| 5,885,449 A | * | 3/1999 | Bergmann et al. ........ | 210/198.1 |
| 5,942,109 A | * | 8/1999 | Wuebker et al. .......... | 210/198.1 |
| 5,942,110 A | * | 8/1999 | Norris ....................... | 210/198.1 |
| 6,231,820 B1 | * | 5/2001 | Wedekamp ................ | 422/186.3 |

* cited by examiner

*Primary Examiner*—John R. Lee
*Assistant Examiner*—Christopher M. Kalivoda

(57) ABSTRACT

An ultraviolet water purifier that includes a chamber tube, a pair of chamber heads, a pair of replaceable primary chamber clamps, a quartz sleeve, and a germicidal ultraviolet lamp. The chamber tube is length adjustable. The pair of chamber heads are rotatably attached to the ends of the chamber tube, respectively, so as to allow the pair of chamber heads to be rotated relative to the chamber tube as desired and provide independently configurable inlet and outlet orientations. The pair of replaceable primary chamber clamps rotatably and interchangeably attach the pair of chamber heads to the ends of the chamber tube, respectively, so as to allow the pair of chamber heads to be readily rotated relative to the chamber tube, interchanged as desired, and allow for more complete disassembly of the purifier. The quartz sleeve extends axially through the chamber tube and the pair of chamber heads. The germicidal ultraviolet lamp extends axially through the quartz sleeve.

29 Claims, 2 Drawing Sheets

ULTRAVIOLET WATER PURIFIER

BACKGROUND OF THE INVENTION

1. Field of the Invention

The present invention relates to a purifier. More particularly, the present invention relates to an ultraviolet water purifier.

2. Description of the Prior Art

Numerous innovations for ultraviolet water purifiers have been provided in the prior art that will be described. Even though these innovations may be suitable for the specific individual purposes to which they address, however, they differ from the present invention.

FOR EXAMPLE, U.S. Pat. No. Des. 331,447 to Boehme et al. teaches the ornamental design of an ultraviolet water purifier.

ANOTHER EXAMPLE, U.S. Pat. No. 3,462,597 to Young teaches a fluid purifier with a tubular body, and an ultraviolet rays emitting lamp enclosed in a quartz tube in the tubular body. A plurality of wiper rings with inserts which are unaffected by the ultraviolet rays, are arranged on the quartz tube and means for operating the rings by hand for cleaning of the outside of the tube.

STILL ANOTHER EXAMPLE, U.S. Pat. No. 3,485,576 to McRae et al. teaches an anode grid external to said lamp but in contact with the water being treated, whereby negatively charged colloidal particles present in said water are attracted to the anode grid and deposited thereon instead of being deposited on the quartz tube of the ultraviolet lamp as a radiation insulating coating thereon.

YET ANOTHER EXAMPLE, U.S. Pat. No. 4,767,932 to Ellner teaches an ultraviolet purification device for irradiating liquids with ultraviolet radiation either in an open system or a closed system which includes a frame or vessel provided with a header plate and a spaced-apart support grid for supporting therebetween a plurality of quartz jackets. Each jacket is provided with an open end which extends beyond the header plate and in which one or more ultraviolet lamps are disposed in tamdem therein. The arrangement is such that the respective lamps are disposed in rows or banks wherein the respective rows or banks can be independently energized depending upon the flow rate of the liquid. Each lamp is constructed so that the electrical contacts for the respective lamp electrodes project from a common end of the lamp, thereby permitting the lamps to be inserted from one side of the frame or vessel. An improved spacer is also provided for specially supporting each lamp within its respective jacket.

STILL YET ANOTHER EXAMPLE, U.S. Pat. No. 4,825,083 to Latel et al. teaches an ultraviolet water treatment plant in which individual ultraviolet lamp units are loosely and retractably located within frames supported in a water treatment channel. Individual frames supporting arrays of parallel lamp units may be removed from the channel, and the lamp units may be individually disengaged from the frame and disassembled for lamp replacement. The frames have unitary plug connectors to a power supply arranged so that the plug of a frame must be disengaged from the supply before that frame can be removed from the channel. The level of water in the channel is controlled according to the rate of flow, and the lamp units are selectively energized according to whether they are immersed so as to match the irradiation provided to the rate and cross section of the flow.

YET STILL ANOTHER EXAMPLE, U.S. Pat. No. 5,019,256 to fill et al. teaches a UV lamp rack assembly usable in an ultraviolet ray wastewater treatment system, the rack including a horizontal hanger bar. When the assembly is installed in a channel through which a stream of wastewater to be treated is conducted, the bar is then supported above the channel in the flow direction of the stream. Depending from the bar at an upstream position is a vertical rod along which sleeves are pivotally mounted at spaced points thereon whereby each sleeve can be swiveled in a horizontal plane. Depending from the bar at a downstream position is a vertical conduit along which detachable lamp couplers are mounted at corresponding points, each coupler housing a lamp socket that is connected through the conduit to a power source. Extending between each sleeve and the coupler corresponding thereto is a lamp unit formed by a transparent protective tube enclosed at its upstream end and housing an elongated UV lamp whose terminal pins are at the downstream end. The upstream end of the unit is slidably received in the rear section of the sleeve, while the downstream end of the unit is securely received in the coupler, the terminal pins of the lamp then being plugged into the socket to render the lamp operative. To remove a particular lamp unit from the rack, it is swiveled to an angular position.

STILL YET ANOTHER EXAMPLE, U.S. Pat. No. 5,200,156 to Wedekamp teaches a device for irradiating flowing liquids and/or gasses with ultraviolet (UV) light comprising a casing with in and outlet apertures and one or more UV light sources wherein the light sources are within protective tubes. The light sources are arranged such that the maximum radiation occurs along the axis of flow of the liquid and/or gasses.

YET STILL ANOTHER EXAMPLE, U.S. Pat. No. 5,885,449 to Bergmann et al. teaches an apparatus for removing microbes from flowing media, such as water, has an essentially cylindrical container, inside of which there is a reaction chamber with UV radiators arranged on a concentric circle, and it also has inlet and outlet openings for the medium to flow through the reaction chamber in a direction parallel to the cylinder axis and on a path maximizes exposure of the medium to the UV radiation.

STILL YET ANOTHER EXAMPLE, U.S. Pat. No. 5,942,109 to Wuebker et al. teaches an apparatus for the treatment of liquids, particularly of cycled water of fish tanks or of ponds with an irradiation unit which is intended to act upon the liquid with light, particularly UV light, and includes at least one lamp which is disposed in a dry space that is separated from the liquid to be irradiated by a transparent glass shield, has at least one cleaning element which faces the glass shield and is disposed movably on the side of the glass shield in contact with the liquid.

YET STILL ANOTHER EXAMPLE, U.S. Pat. No. 5,942,110 to Norris teaches a water treatment apparatus comprising an elongate metallic brace mounted to a wall. Components are for connecting the elongate metallic brace to an inlet water pipe and an outlet water pipe, so as to electrically ground the inlet water pipe to the outlet water pipe. The elongated metallic brace will also reinforce and stabilize the apparatus in an in line installation to the inlet water pipe and the outlet water pipe. A housing assembly has a lamp entrance, a water inlet port and a water outlet port. The housing assembly is prefabricated, so that it can be completely dismantled for cleaning and easily reassembled for use. A facility is for fluidly attaching and detaching the inlet water pipe to the water inlet port and the outlet water pipe to the water outlet port of the housing assembly for a quick in line installation. An elongate transparent quartz tube connected to the lamp entrance and centrally disposed in a leakproof manner within the housing assembly, is capable of passing ultraviolet rays therethrough. An elongate ultraviolet lamp is inserted through the lamp entrance of the housing assembly and into the elongate transparent quartz tube, so that water passing through the housing assembly will have bacteria removed therefrom.

STILL YET ANOTHER EXAMPLE, U.S. Pat. No. 6,231, 820 to Wedekamp teaches a UV disinfecting device for flowing fluids, having a frame and a certain number of lamp units with UV lamps, whereby the lamp units each have at least one electrical connection and are held by the frame substantially parallel and spaced from each other. For securing the lamp units, clamps are provided, which are particularly favorable for fluid flow. Preferably, each lamp is encased in a respective casing tube having one or more elastomeric end stoppers and the clamps are metallic leaf springs which engage the stoppers. The electrical leads pass through the stoppers. This facilitates easy replacement of failing lamps.

It is apparent that numerous innovations for ultraviolet water purifiers have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide an ultraviolet water purifier that avoids the disadvantages of the prior art.

ANOTHER OBJECT of the present invention is to provide an ultraviolet water purifier that is simple to use.

BRIEFLY STATED, STILL ANOTHER OBJECT of the present invention is to provide an ultraviolet water purifier that includes a chamber tube, a pair of chamber heads, a pair of replaceable primary chamber clamps, a quartz sleeve, and a germicidal ultraviolet lamp. The chamber tube is length adjustable. The pair of chamber heads are rotatably attached to the ends of the chamber tube, respectively, so as to allow the pair of chamber heads to be rotated relative to the chamber tube as desired and provide independently configurable inlet and outlet orientations. The pair of replaceable primary chamber clamps rotatably and interchangeably attach the pair of chamber heads to the ends of the chamber tube, respectively, so as to allow the pair of chamber heads to be readily rotated relative to the chamber tube, interchanged as desired, and allow for more complete disassembly of the purifier. The quartz sleeve extends axially through the chamber tube and the pair of chamber heads. The germicidal ultraviolet lamp extends axially through the quartz sleeve.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

DESCRIPTION OF THE DRAWING

The figures of the drawing are briefly described as follows.

Figure 1:
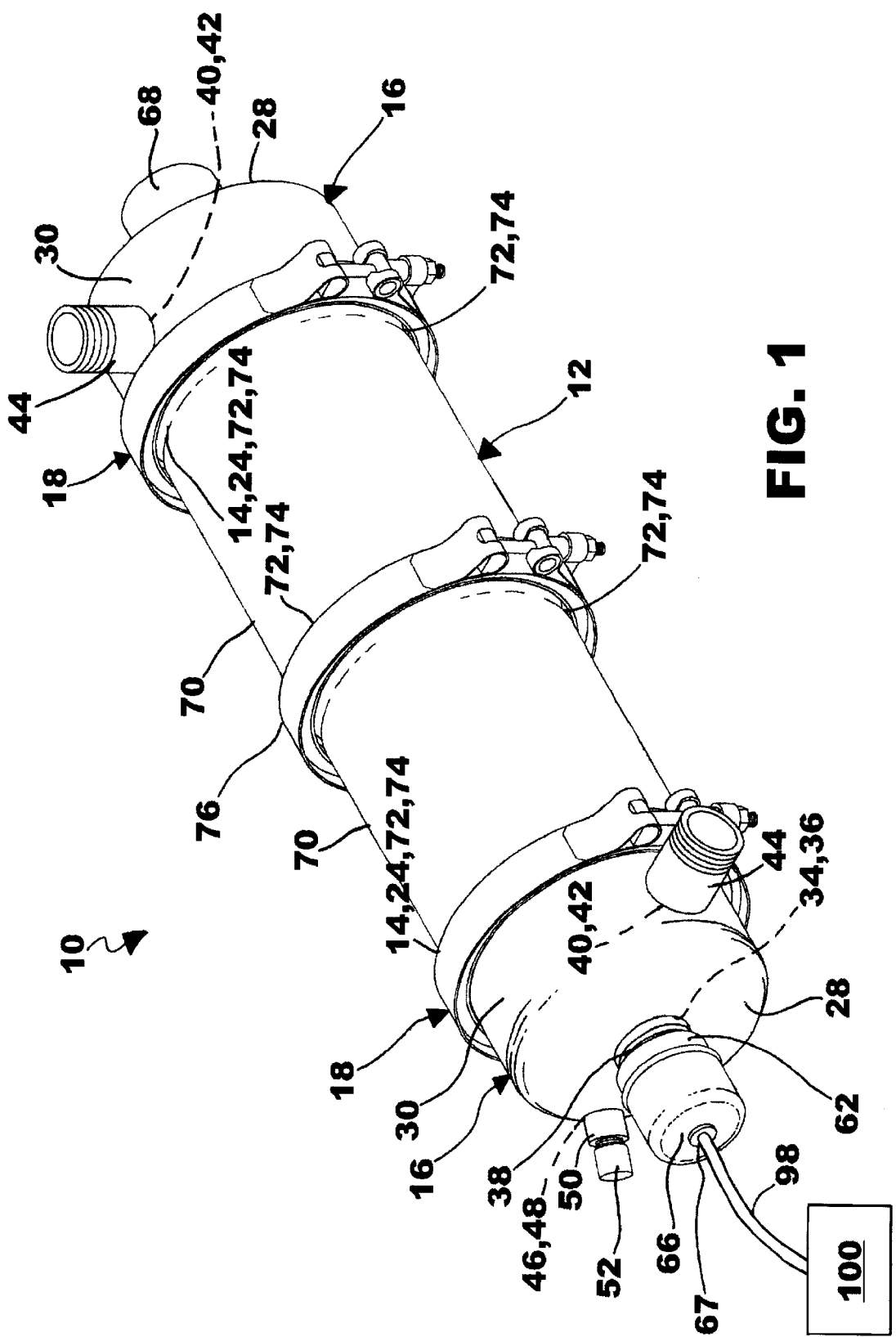
FIG. 1 is a diagrammatic perspective view of the present invention.

LIST OF REFERENCE NUMERALS UTILIZED IN THE DRAWING 10 ultraviolet water purifier of present invention
12 chamber tube
14 pair of ends of chamber tube 12
16 pair of chamber heads
18 pair of replaceable primary chamber clamps
20 quartz sleeve
22 germicidal ultraviolet lamp
24 flare extending circumferentially and completely around each end of pair of ends 14 of chamber tube 12
26 flange contained in, and extending circumferentially and completely around, each replaceable primary chamber clamp of pair of replaceable primary chamber clamps 18
28 pair of ends of each chamber head of pair of chamber heads 16
30 body of each chamber head of pair of chamber heads 16
32 perimeter defining one end 28 of each chamber head of pair of chamber heads 16
34 first throughbore extending axially through other end 28 of each chamber head of pair of chamber heads 16
36 perimeter defining first throughbore 34 through other end 28 of each chamber head of pair of chamber heads 16
38 first fitting extending axially outwardly from perimeter 36 of first throughbore 34 through other end 28 of each chamber head of pair of chamber heads 16
40 second throughbore extending radially through body 30 of each chamber head of pair of chamber heads 16
42 perimeter defining second throughbore 40 through body 30 of each chamber head of pair of chamber heads 16
44 second fitting extending radially outwardly from perimeter 42 of second throughbore 40 in body 30 of each chamber head of pair of chamber heads 16
46 third throughbore extending through other end 28 of each chamber head of pair of chamber heads 16
48 perimeter defining third throughbore 46 through other end 28 of each chamber head of pair of chamber heads 16
50 third fitting extending outwardly from perimeter 48 of third throughbore 46 in each chamber head of pair of chamber heads 16
52 sight port threadably received by third fitting 50 of one chamber head of pair of chamber heads 16
54 drain plug threadably received by third fitting 50 of other chamber head of pair of chamber heads 16
56 lip extending axially outwardly from perimeter 32 of one end 28 of each chamber head of pair of chamber heads 16
58 first end of quartz sleeve 20
60 second end of quartz sleeve 20
62 first static gland nut maintaining first end 58 of quartz sleeve 20 through first fitting 38 of one chamber head of pair of chamber heads 16
64 second static gland nut maintaining second end 60 of quartz sleeve 20 through first fitting 38 of other chamber head of pair of chamber heads 16
66 first easy off end cap covering first static gland nut 62
67 throughbore extending axially through first easy off end cap 66
68 second easy off end cap covering second static gland nut 64
70 plurality of sub-chamber tubes dividing chamber tube 12
72 pair of ends of each sub-chamber tube of plurality of sub-chamber tubes 70 dividing chamber tube 12
74 flare extending circumferentially and completely around each end of pair of ends 72 of each sub-chamber tube of plurality of sub-chambers 70 dividing chamber tube 12

76 at least one replaceable secondary chamber clamp
78 flange extending in, and circumferentially and completely around, each replaceable secondary chamber clamp 76
80 first TEFLON washer
82 first rubber O-ring
84 second TEFLON washer
86 second rubber O-ring
88 pair of third rubber O-rings
90 at least one pair of fourth rubber O-rings
92 fifth rubber O-ring
94 sixth rubber O-ring
96 lamp socket
98 lead wire for electrically communicating with ballast assembly 100
100 ballast assembly

DETAILED DESCRIPTION OF THE PREFERRED EMBODIMENT

Figure 2:
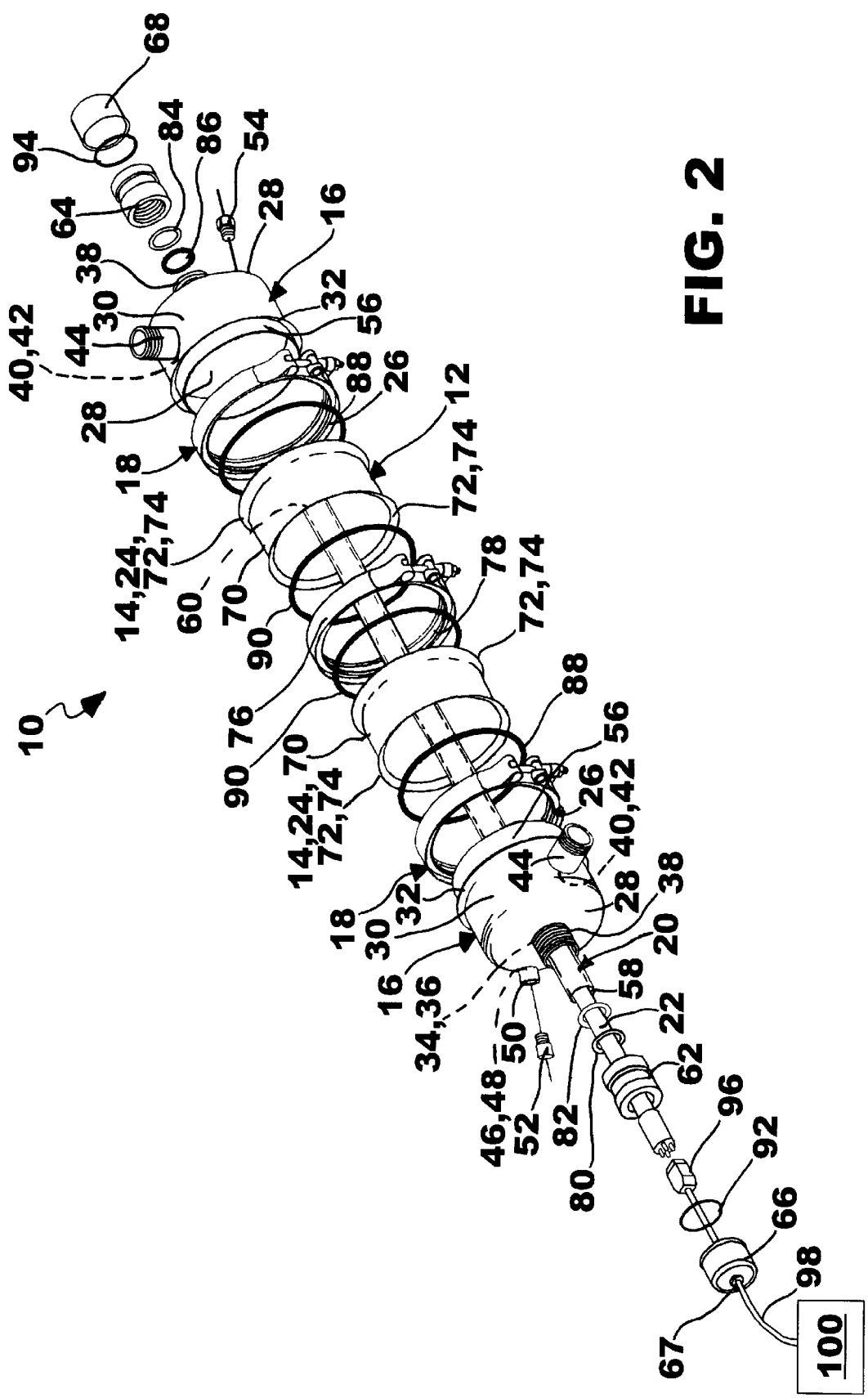
FIG. 2 is an exploded diagrammatic perspective view of the present invention shown in FIG. 1.

Referring now to the figures, in which like numerals indicate like parts, and particularly to FIGS. 1 and 2, which are, respectively, a diagrammatic perspective view of the present invention, and an exploded diagrammatic perspective view of the present invention shown in FIG. 1, the ultraviolet water purifier of the present invention is shown at 10.

The ultraviolet water purifier 10 comprises a chamber tube 12. The chamber tube 12 is cylindrically-shaped, length adjustable, and has a pair of ends 14.

The ultraviolet water purifier 10 further comprises a pair of chamber heads 16. The pair of chamber heads 16 are rotatably attached to the pair of ends 14 of the chamber tube 12, respectively, so as to allow the pair of chamber heads 16 to be rotated relative to the chamber tube 12 as desired and provide independently configurable inlet and outlet orientations. The pair of chamber heads 16 are interchangeably attached to the pair of ends 14 of the chamber tube 12, respectively, so as to facilitate a wide variety of capacities and configurations from a relatively limited number of standardized parts.

The ultraviolet water purifier 10 further comprises a pair of replaceable primary chamber clamps 18. The pair of replaceable primary chamber clamps 18 rotatably and interchangeably attach the pair of chamber heads 16 to the pair of ends 14 of the chamber tube 12, respectively, so as to allow the pair of chamber heads 16 to be readily rotated relative to the chamber tube 12, interchanged as desired, and allow for more complete disassembly of the ultraviolet water purifier 10.

The ultraviolet water purifier 10 further comprises a quartz sleeve 20. The quartz sleeve 20 extends axially through the chamber tube 12 and the pair of chamber heads 16.

The ultraviolet water purifier 10 further comprises a germicidal ultraviolet lamp 22. The germicidal ultraviolet lamp 22 extends axially through the quartz sleeve 20.

Each end 14 of the chamber tube 12 is open, and has a flare 24 thereon that extends circumferentially and completely therearound.

Each replaceable primary chamber clamp 18 contains a flange 26 that extends circumferentially and completely therearound, and is V-shaped. The flare 24 on each end 14 of the chamber tube 12 extends into one side of an associated replaceable primary chamber clamp 18, up to the flange 26 therein.

Each chamber head 16 has a pair of ends 28 and a body 30. The body 30 extends from one end 28 to the other end 28 of an associated chamber head 16, and is cylindrically-shaped and tubular. The one end 28 of each chamber head 16 is open and defined by a perimeter 32, while the other end 28 of each chamber head 16 is substantially closed, and has a first throughbore 34 that extends axially therethrough. The first throughbore 34 in each chamber head 16 is defined by a perimeter 36, and the first throughbore 34 in one chamber head 16 is axially aligned with the first throughbore 34 in the other chamber head 16.

Each chamber head 16 has a first fitting 38. The first fitting 38 of each chamber head 16 is tubular, cylindrically-shaped, externally threaded, and extends axially outwardly from the perimeter 36 of the first throughbore 34 in an associated chamber head 16.

Each chamber head 16 further has a second throughbore 40. The second throughbore 40 in each chamber head 16 extends radially through the body 30 of an associated chamber head 16, and is defined by a perimeter 42.

Each chamber head 16 further has a second fitting 44. The second fitting 44 in each chamber head 16 is tubular, cylindrically-shaped, externally threaded, and extends radially outwardly from the perimeter 42 of the second throughbore 40 in the body 30 of an associated chamber head 16.

Each chamber head 16 further has a third throughbore 46. The third throughbore 46 in each chamber head 16 extends through the other end 28 of an associated chamber head 16, and is defined by a perimeter 48.

Each chamber head 16 further has a third fitting 50. The third fitting 50 of each chamber head 16 is tubular, cylindrically-shaped, internally threaded, and extends outwardly from the perimeter 48 of the third throughbore 46 in an associated chamber head 16. The third fitting 50 of one chamber head 16 threadably receives a slight port plug 52, while the third fitting 50 of the other chamber head 16 threadably receives a drain plug 54.

The first fitting 38, the second fitting 44, the third fitting 50, and the body 30 of each chamber head 16 are formed as one-piece for eliminating welded joints which are notorious trouble spots.

Each chamber head 16 further has a lip 56. The lip 56 of each chamber head 16 extends axially outwardly from the perimeter 32 of the one end 28 of an associated chamber head 16, and into the other side of an associated replaceable primary chamber clamp 18, up to the flange 26 therein.

The quartz sleeve 20 originates at a first end 58, and extends axially therefrom through the first fitting 38 of one chamber head 16, through the chamber tube 12, and through the first fitting 38 of the other chamber head 16, to a second end 60. The first end 58 of the quartz sleeve 20 is maintained through the first fitting 38 of the one chamber head 16 by a first static gland nut 62. The first static gland nut 62 is internally threaded and threadably engages the first fitting 38 of the one chamber head 16. The second end 60 of the quartz sleeve 20 is maintained through the first fitting 38 of the other chamber head 16 by a second static gland nut 64. The second static gland nut 64 is internally threaded and threadably engages the first fitting 38 of the other chamber head 16.

The first static gland nut 62 is covered by a first easy off end cap 66 that has a throughbore 67 extending axially therethrough, and the second static gland nut 64 is covered by a second easy off end cap 68.

The chamber tube 12 is divided into a plurality of sub-chamber tubes 70. Each sub-chamber tube 70 is cylindrically-shaped, and has a pair of ends 72. The pair of ends 72 of each sub-chamber tube 70 are open and have a flare 74 thereon. The flare 74 on each end 72 of each sub-chamber tube 70 extends circumferentially and completely therearound.

The ultraviolet water purifier 10 further comprises at least one replaceable secondary chamber clamp 76. Each replaceable secondary chamber clamp 76 contains a flange 78. The flange 78 in each replaceable secondary chamber clamp 76 extends circumferentially and completely therearound, and is V-shaped.

The plurality of sub-chamber tubes 70 are attached to each, other end-to-end, by the at least one replaceable secondary chamber clamp 76 so as to allow the chamber tube 12 to be length adjustable, by merely removing or adding additional sub-chamber tubes 70. The flare 74 on each end 72 of each sub-chamber tube 70 extends into an associated side of an associated replaceable secondary chamber clamp 76, up to the flange 78 therein.

The ultraviolet water purifier 10 further comprises a first TEFLON washer 80 and a first rubber O-ring 82. The first TEFLON washer 80 and the first O-ring 82 are disposed between the first fitting 38 of one chamber head 16 and the first static gland nut 62.

The ultraviolet water purifier 10 further comprises a second TEFLON washer 84 and a second rubber O-ring 86. The second TEFLON washer 84 and the second O-ring 86 are disposed between the first fitting 38 of the other chamber head 16 and the second static gland nut 64.

The ultraviolet water purifier 10 further comprises a pair of third rubber O-rings 88. The pair of third rubber O-rings 88 are disposed between the pair of replaceable primary chamber clamps 18 and the pair ends 14 of the channel tube 12, respectively.

The ultraviolet water purifier 10 further comprises at least one pair of fourth rubber O-rings 90. Each fourth rubber O-ring 90 is disposed between each replaceable secondary chamber clamp 76 and an end 72 of a cooperating sub-channel tube 70.

The ultraviolet water purifier 10 further comprising a fifth rubber O-ring 92. The fifth rubber O-ring 92 is disposed between the first static gland nut 62 and the first easy off end cap 66.

The ultraviolet water purifier 10 further comprises a sixth rubber O-ring 94. The sixth rubber O-ring 94 is disposed between the second static gland nut 64 and the second easy off end cap 68.

The ultraviolet water purifier 10 further comprises a lamp socket 96. The lamp socket 96 releasably engages the ultraviolet germicidal lamp 22, and is disposed in the first easy off end cap 66.

The ultraviolet water purifier 10 further comprises a lead wire 98. The lead wire 98 electrically communicates with the lamp socket 96, extends through the throughbore 67 in the first easy off end cap 66, and is for electrically communicating with a ballast assembly 100.

It will be understood that each of the elements described above, or two or more together, may also find a useful application in other types of constructions differing from the types described above.

While the invention has been illustrated and described as embodied in an ultraviolet water purifier, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. An ultraviolet water purifier, comprising:
   a) a chamber tube;
   b) a pair of chamber heads;
   c) a pair of replaceable primary chamber clamps;
   d) a quartz sleeve; and
   e) a germicidal ultraviolet lamp;
   wherein said chamber tube is length adjustable;
   wherein said chamber tube has a pair of ends;
   wherein said pair of chamber heads are rotatably attached to said pair of ends of said chamber tube, respectively, so as to allow said pair of chamber heads to be rotated relative to said chamber tube as desired and provide independently configurable inlet and outlet orientations;
   wherein said pair of chamber heads are interchangeably attached to said pair of ends of said chamber tube, respectively, so as to facilitate a wide variety of capacities and configurations from a relatively limited number of standardized parts;
   wherein said pair of replaceable primary chamber clamps rotatably and interchangeably attach said pair of chamber heads to said pair of ends of said chamber tube, respectively, so as to allow said pair of chamber heads to be readily rotated relative to said chamber tube and, interchanged as desired, and allow for more complete disassembly of said ultraviolet water purifier;
   wherein said quartz sleeve extends axially through said chamber tube and said pair of chamber heads; and
   wherein said germicidal ultraviolet lamp extends axially through said quartz sleeve.

2. The purifier as defined in claim 1, wherein said chamber tube is cylindrically-shaped; and
   wherein said pair of ends of said chamber tube are open.

3. The purifier as defined in claim 2, wherein each end of said chamber tube has a flare thereon;
   wherein said flare on each end of said chamber tube extends circumferentially therearound; and
   wherein said flare on each end of said chamber tube extends completely therearound.

4. The purifier as defined in claim 3, wherein each replaceable primary chamber clamp contains a flange;
   wherein said flange in each replaceable primary chamber clamp extends circumferentially therearound;
   wherein said flange in each replaceable primary chamber clamp extends completely therearound; and
   wherein said flange in each replaceable primary chamber clamp is V-shaped.

5. The purifier as defined in claim 4, wherein said flare on each end of said chamber tube extends into one side of an associated replaceable primary chamber clamp, up to said flange therein.

6. The purifier as defined in claim 5, wherein each chamber head has a pair of ends;
   wherein each chamber head has a body;
   wherein said body extends from one end to the other end of each chamber head;

wherein said body of each chamber head is cylindrically-shaped;

wherein said body of each chamber head is tubular;

wherein said one end of each chamber head is open;

wherein said one end of each said chamber head is defined by a perimeter;

wherein said other end of each chamber head is substantially closed;

wherein said other end of each said chamber head has a first throughbore;

wherein said first throughbore extends axially through said other end of each chamber head;

wherein said first throughbore is defined by a perimeter; and wherein said first throughbore in one chamber head is axially aligned with said first throughbore in the other chamber head.

7. The purifier as defined in claim 6, wherein each chamber head has a first fitting;

wherein said first fitting of each chamber head is tubular;

wherein said first fitting of each chamber head is cylindrically-shaped;

wherein said first fitting of each chamber head is externally threaded; and wherein said first fitting of each chamber head extends axially outwardly from said perimeter of said first throughbore in an associated chamber head.

8. The purifier as defined in claim 7, wherein each chamber head has a second throughbore;

wherein said second throughbore extends radially through said body of each chamber head; and wherein said second throughbore in each chamber head is defined by a perimeter.

9. The purifier as defined in claim 8, wherein each chamber head has a second fitting;

wherein said second fitting of each chamber head is tubular;

wherein said second fitting of each chamber head is cylindrically-shaped;

wherein said second fitting of each chamber head is externally threaded; and wherein said second fitting of each chamber head extends radially outwardly from said perimeter of said second throughbore in said body of an associated chamber head.

10. The purifier as defined in claim 9, wherein each chamber head has a third throughbore;

wherein said third throughbore extends through said other end of each chamber head; and wherein said third throughbore in each chamber head is defined by a perimeter.

11. The purifier as defined in claim 10, wherein each chamber head has a third fitting;

wherein said third fitting of each chamber head is tubular;

wherein said third fitting of each chamber head is cylindrically-shaped;

wherein said third fitting of each chamber head is internally threaded; and wherein said third fitting of each chamber head extends outwardly from said perimeter of said third throughbore in an associated chamber head.

12. The purifier as defined in claim 11, wherein said third fitting of one chamber head threadably receives a slight port plug; and wherein said third fitting of the other chamber head threadably receives a drain plug.

13. The purifier as defined in claim 11, wherein said first fitting, said second fitting, said third fitting, and said body of each chamber head are formed as one-piece for eliminating welded joints which are notorious trouble spots.

14. The purifier as defined in claim 6, wherein each chamber head has a lip; and wherein said lip extends axially outwardly from said perimeter of said one end of each chamber head.

15. The purifier as defined in claim 14, wherein said lip on said one end of each chamber head extends into the other side of an associated replaceable primary chamber clamp, up to said flange therein.

16. The purifier as defined in claim 7, wherein said quartz sleeve originates at a first end, and extends axially therefrom, through said first fitting of one chamber head, through said chamber tube, and through said first fitting of the other chamber head, to a second end;

wherein said first end of said quartz sleeve is maintained through said first fitting of said one chamber head by a first static gland nut;

wherein said first static gland nut is internally threaded;

wherein said first static gland nut threadably engages said first fitting of said one chamber head;

wherein said second end of said quartz sleeve is maintained through said first fitting of said other chamber head by a second static gland nut;

wherein said second static gland nut is internally threaded; and wherein said second static gland nut threadably engages said first fitting of said other chamber head.

17. The purifier as defined in claim 16, wherein said first static gland nut is covered by a first easy off end cap;

wherein said first easy off end cap has a throughbore;

wherein said throughbore extends axially through said first easy off end cap; and wherein said second static gland nut is covered by a second easy off end cap.

18. The purifier as defined in claim 1, wherein said chamber tube is divided into a plurality of sub-chamber tubes;

wherein each sub-chamber tube is cylindrically-shaped;

wherein each sub-chamber tube has a pair of ends;

wherein said pair of ends of each sub-chamber tube are open;

wherein each end of each sub-chamber tube has a flare thereon;

wherein said flare on each end of each sub-chamber tube extends circumferentially therearound; and wherein said flare on each end of each sub-chamber tube extends completely therearound.

19. The purifier as defined in claim 18, further comprising at least one replaceable secondary chamber clamp;

wherein each replaceable secondary chamber clamp contains a flange;

wherein said flange in each replaceable secondary chamber clamp extends circumferentially therearound;

wherein said flange in each replaceable secondary chamber clamp extends completely therearound; and wherein said flange in each replaceable secondary chamber clamp is V-shaped.

20. The purifier as defined in claim 19, wherein said plurality of sub-chamber tubes are attached to each other, end-to-end, by said at least one replaceable secondary chamber clamp so as to allow said chamber tube to be length adjustable, by merely removing or adding additional sub-chamber tubes.

21. The purifier as defined in claim 19, wherein said flare on each end of each sub-chamber tube extends into an associated side of an associated replaceable secondary chamber clamp, up to said flange therein.

22. The purifier as defined in claim 17, further comprising a first tetrafluoroethylene fluorocarbon polymer washer and a first rubber O-ring; and wherein said first tetrafluoroethylene fluorocarbon polymer washer and said first O-ring are disposed between said first fitting of one chamber head and said first static gland nut.

23. The purifier as defined in claim 22, further comprising a second tetrafluoroethylene fluorocarbon polymer washer and a second rubber O-ring; and wherein said second tetrafluoroethylene fluorocarbon polymer washer and said second O-ring are disposed between said first fitting of the other chamber head and said second static gland nut.

24. The purifier as defined in claim 23, further comprising a pair of third rubber O-rings; and wherein said pair of third rubber O-rings are disposed between said pair of replaceable primary chamber clamps and said pair ends of said channel tube, respectively.

25. The purifier as defined in claim 24, further comprising at least one pair of fourth rubber O-rings; and wherein each fourth rubber O-ring is disposed between each replaceable secondary chamber clamp and an end of a cooperating sub-channel tube.

26. The purifier as defined in claim 25, further comprising a fifth rubber O-ring; and wherein said fifth rubber O-ring is disposed between said first static gland nut and said first easy off end cap.

27. The purifier as defined in claim 26, further comprising a sixth rubber O-ring; and wherein said sixth rubber O-ring is disposed between said second static gland nut and said second easy off end cap.

28. The purifier as defined in claim 17, further comprising a lamp socket;

wherein said lamp socket releasably engages said ultraviolet germicidal lamp; and wherein said lamp socket is disposed in said first easy off end cap.

29. The purifier as defined in claim 28, further comprising a lead wire;

wherein said lead wire electrically communicates with said lamp socket;

wherein said lead wire extends through said throughbore in said first easy off end cap; and wherein said lead wire is for electrically communicating with a ballast assembly.

* * * * *